US005835746A

United States Patent [19]

Girardeau, Jr. et al.

[11] Patent Number: 5,835,746

[45] Date of Patent: Nov. 10, 1998

[54] METHOD AND APPARATUS FOR FETCHING AND ISSUING DUAL-WORD OR MULTIPLE INSTRUCTIONS IN A DATA PROCESSING SYSTEM

[75] Inventors: James W. Girardeau, Jr.; Nicole D. Teitler, both of Austin, Tex.

[73] Assignee: Motorola, Inc., Schaumbur, Ill.

[21] Appl. No.: 845,096

[22] Filed: Apr. 21, 1997

[51] Int. Cl.[6] ........ G06F 9/22

[52] U.S. Cl. ........ 395/391; 395/381

[58] Field of Search ........ 395/391, 390, 395/381, 800.23

[56] References Cited

U.S. PATENT DOCUMENTS

| | | | |
|---|---|---|---|
| 3,629,853 | 12/1971 | Newton | 395/382 |
| 5,131,086 | 7/1992 | Circello et al. | 395/389 |
| 5,179,671 | 1/1993 | Kelly et al. | 395/898 |
| 5,241,636 | 8/1993 | Kohn | 395/391 |
| 5,488,729 | 1/1996 | Vegesna et al. | 395/385 |

*Primary Examiner*—Krisna Lim
*Assistant Examiner*—Kenneth R. Coulter
*Attorney, Agent, or Firm*—Craig J. Yudell

[57] ABSTRACT

An instruction fetch and issuance unit (200) fetches two instruction words and issues at least one instruction word to an instruction decoder (250) per clock cycle. Two multiplexers (220, 230) receive the two fetched instructions and one or both of two of three words stored in an instruction register (240). A controller (210) selectively controls (207–209), in accordance with a state diagram (300), the loading of three words into the instruction register (240) from among the inputs of the multiplexers (220,230). The instruction register (240) issues up to two instructions per clock cycle without requiring the processor to stall to retrieve an additional word, allowing efficient issuance of a double-word instruction or two instructions in parallel.

9 Claims, 2 Drawing Sheets

METHOD AND APPARATUS FOR FETCHING AND ISSUING DUAL-WORD OR MULTIPLE INSTRUCTIONS IN A DATA PROCESSING SYSTEM

FIELD OF THE INVENTION

The present invention relates in general to data processing systems, and in particular an instruction fetch and issuance apparatus within a data processing system.

BACKGROUND OF THE INVENTION

In data processing systems such as microcontrollers and microprocessors, instructions are typically fetched one word at a time from an instruction cache or Read-Only Memory (ROM) that typically has a width equal to the instruction word, which is equal to the minimal length instruction executable by the processor. When multiple words are required to execute a single instruction, a stall is introduced in the execution of the processor while the second word is fetched into an instruction register.

For example, FIG. 1 shows an instruction fetch and an issuance system used in the prior art. Fetch and issuance system 100 includes instruction register 110 that holds a single-word received from a program memory such as a ROM. Fetch and issuance apparatus 100 includes an instruction decoder 120 for decoding the received instructions and outputting control signals to the execution units within the data processing system. If a multiple word instruction is to be executed by the processor, such as a double-word or dual-word instruction, the first word is retrieved from memory and loaded into the instruction register 110. Processing is then stalled while the second word of the double-word instruction is retrieved from memory and loaded into the instruction register 110. Thereafter, instruction decoder 120 can decode the double-word instruction and provide the appropriate output control signals to the execution units executing the double-word instruction. As can be seen, speed and efficiency of the processor are degraded because of the stall introduced when executing the double-word instruction.

A second inefficiency is created by the structure of the prior art fetch and issuance apparatus 100 when parallel execution of multiple instructions is attempted. As will be appreciated, a first instruction must be loaded into instruction register 110 and be held for an additional clock cycle while the second instruction to be executed in parallel is retrieved from memory. Thereafter, the two instructions can be decoded and executed in parallel. However, again, the architecture of fetch and issuance apparatus 100 requires a delay in its operation in order to execute the two instructions in parallel.

In order to improve this inherent inefficiency, data processing systems in the prior art allow additional words to be retrieved from memory and loaded into an instruction register along with the addressed word. However, when the system optionally executes either a single-word or a double-word instruction, loading of the second word is sometimes wasted and that instruction must be loaded again from memory on another clock cycle, thereby unnecessarily increasing bus traffic. Further, such a system would require that all the double-word instructions be aligned in memory such that a single access will retrieve both words of the double-word instruction. This would substantially complicate the memory controller and system hardware to maintain the rigid requirements of such an execution scheme.

Thus, as can be seen, there is a need for a fetch and issuance apparatus in a data processing system being capable of fetching and issuing both single and double-word instructions, and further being capable of issuing two single-word instructions to be executed simultaneously in a parallel processor without substantially increasing the complexity of the system or adding to system costs by adding additional components and/or under-utilizing memory space.

DESCRIPTION OF A PREFERRED EMBODIMENT

Figure 1:
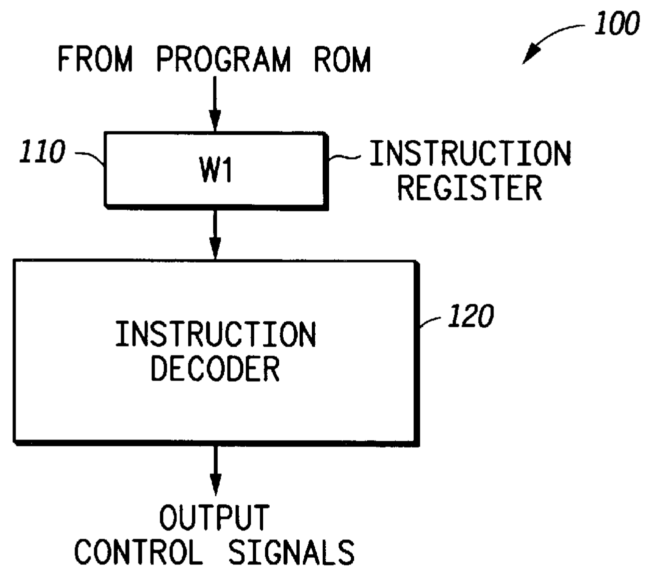
FIG. 1 shows an instruction fetch and an issuance system of the prior art.
Figure 2:
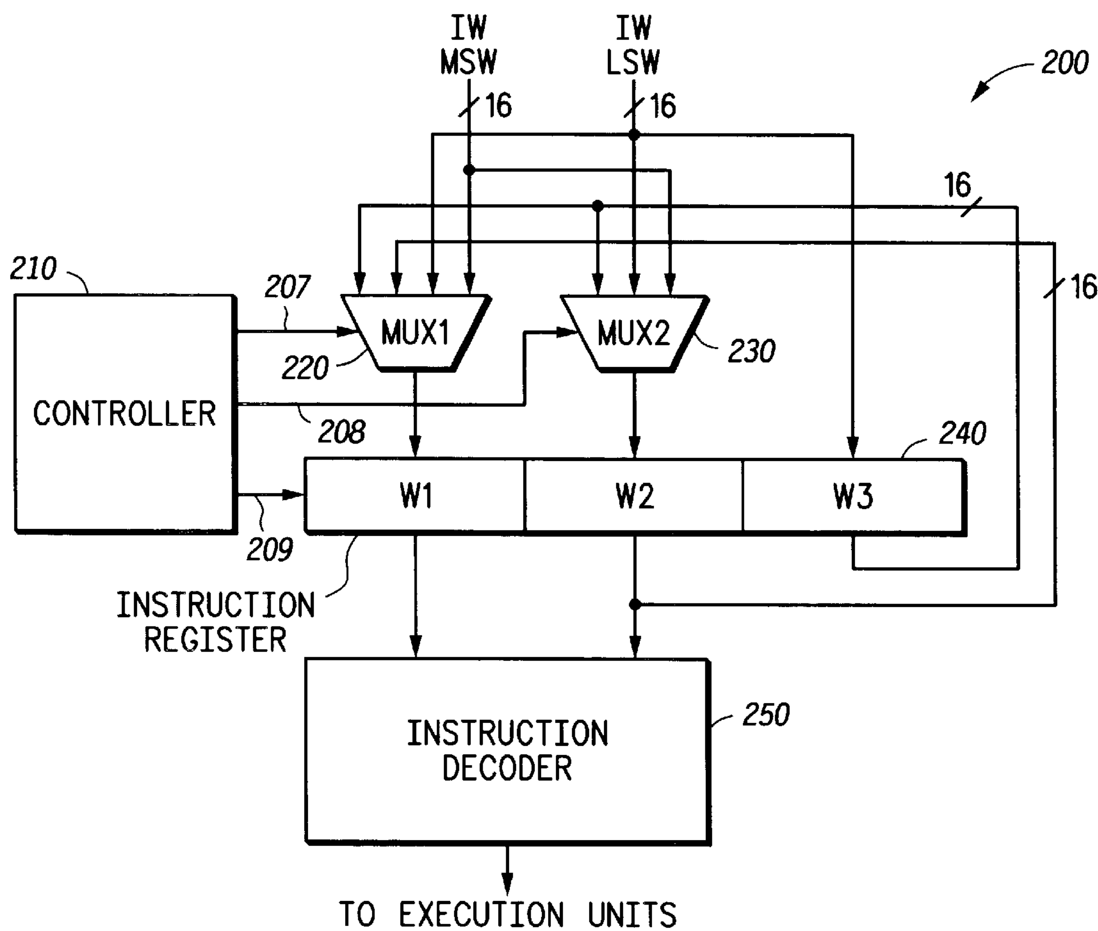
FIG. 2 shows a fetch and issue apparatus for a data processing system such as a microcontroller or microprocessor, in accordance with the preferred embodiment of the present invention.

With reference now to FIG. 2, there is shown Apparatus 200 receives a first Instruction Word (IW-MSW) and a second Instruction Word (IW-LSW) for a memory device such as a ROM or random access memory. IW-MSW and IW-LSW are retrieved from a two consecutive address locations in the memory. Thus, IW-MSW is considered a most significant word (MSW) and IW-LSW is considered a least significant word (LSW) retrieved from the memory.

As used in this preferred embodiment, each instruction word is 16 bits wide. However, an instruction word length could be of any bit width such as 8, 16, 32, or 64 bits wide depending on the particular application of a preferred embodiment. Accordingly, each of the data buses received by MUXs 220, 230 are designated as 16-bit wide buses.

As seen in FIG. 2, an instruction word received from MUX1 220 is loaded as register word W1, and an instruction word received from MUX2 230 is loaded as register word W2. IW-LSW is loaded as register word W3 when appropriately enabled by load signals from controller 210. Controller 210 controls MUX1 220 and MUX2 230 with control signals 207, 208 that may select one of a multiplexer's input instruction words to be output from that multiplexer. Controller 210 generates control signal 209, which controls the instructions output from instruction register 240. Controller 210 can be a microprocessor, microcontroller or other logic circuitry capable of performing complex logical functions such as those necessary for implementing the state diagram shown in FIG. 3. Controller 210 may also be a memory controller for accessing a memory to provide IW MSW and IW LSW to MUX1 and MUX2.

Instruction register 240 is three instruction words wide and holds a first instruction word (W1), a second instruction word (W2), and a third instruction word (W3) (also referred to as first register word, second register word, and third register word, respectively). As seen in FIG. 2, both MUX1 220 and MUX2 230 receive both of the instruction words, IW-MSW and IW-LSW, from memory. In addition, MUX1 220 receives instruction word W2 and instruction word W3 held in instruction register 240 as inputs. Similarly, MUX2 230 receives instruction word W3 held in instruction register 240 as an additional input.

In response to control signal 209, instruction register 240 issues instruction word W1 and W2 to instruction decoder 250 during a single clock cycle to allow multiple instructions or a dual-word instruction to be issued. Thus, when issuing multiple instructions to be executed in parallel, instruction decoder 250 receives both instruction words W1 and W2 without a stall being required to retrieve both instructions. Thereafter, instruction decoder 250 decodes the instructions and provides control signals to the execution units of the data processing system (not shown) for executing the parallel instructions. Alternatively, a double-word instruction contained in instruction register 240 as instruction words W1 and W2 can be simultaneously received and then decoded by instruction decoder 250 to allow the double-word instruction to be executed by the execution units.

In operation, when fetch and issuance unit 200 is reset, controller 210 analyzes the first address of an executable program stored in memory to determine if the address is an odd address or an even address. If the address is an even address, controller 210 fetches the least significant and most significant words at that address into register word W2 and register word W1, respectively. On the other hand, if the beginning program address is an odd address, controller 210 fetches the least significant word and the most significant word from that address, but only loads the least significant word (IW-LSW) in register word W1. Thereafter, controller 210 operates in a manner in accordance with the state diagram shown in FIG. 3 to properly sequence through the instruction stream.

Figure 3:
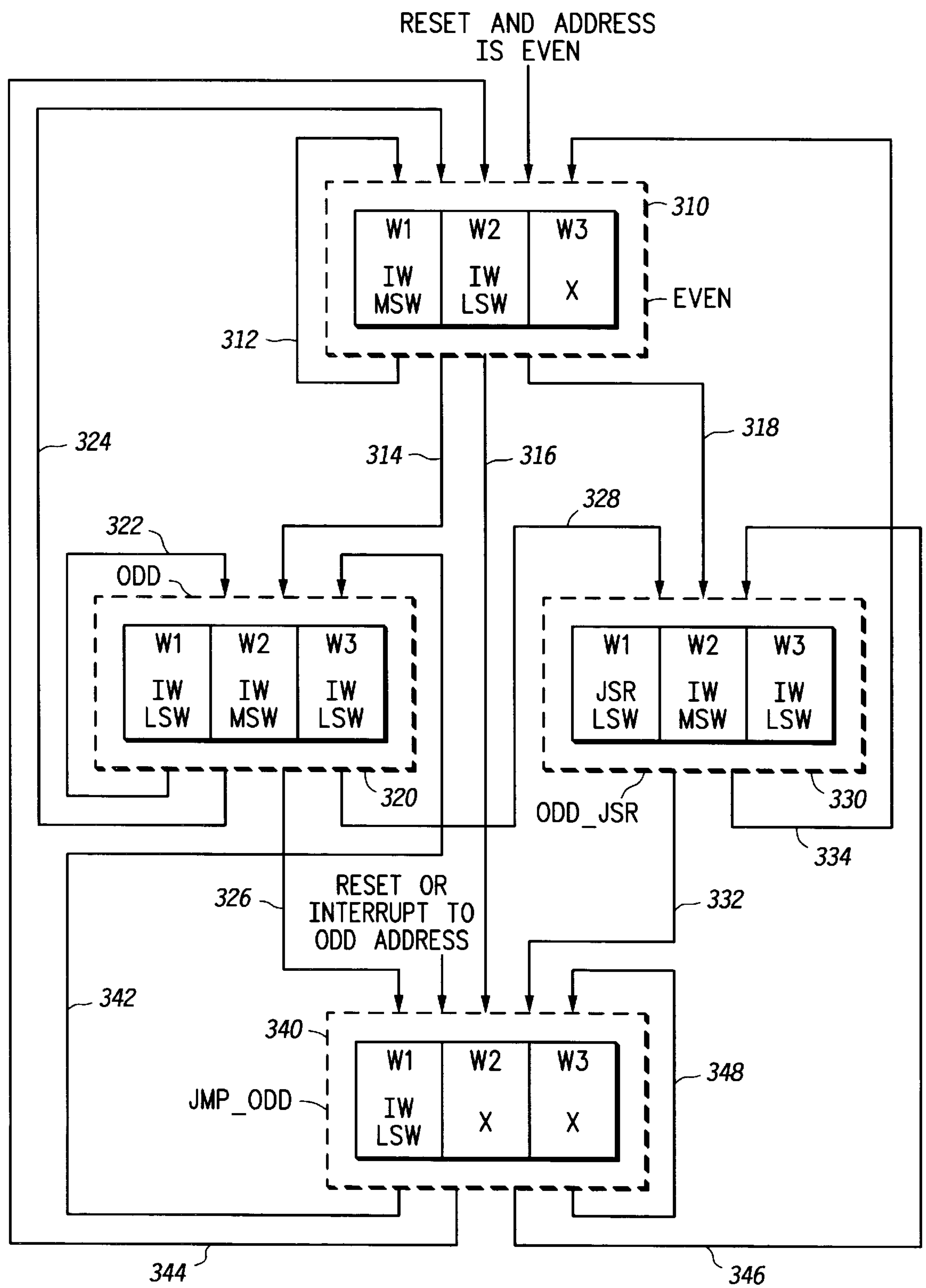
FIG. 3 show a logic state diagram of the operation of the fetch and issuance unit in accordance with a preferred embodiment of the present invention.

FIG. 3 shows a logic state diagram of the operation of the fetch and issuance unit in accordance with a preferred embodiment of the present invention. Upon reset of the unit 200, controller 210 places the unit in state 310 when the first address of the executable program is an even address, and places the unit in state 340 when the first address of the executable program is an odd address. States 310 and 320 describe states of steady-state operation of the fetch and issuance unit, representing states of sequential execution of a program. States 330, 340 represent non-steady-state states of operation for the fetch and issuance unit where changes in program flow such as jumps or branches set the program counter to a new value.

For transition 312 from state 310, a double-word instruction is issued from instruction register 240 and the most significant word (IW MSW) and least significant word (IW LSW) are fetched into instruction words W1 and W2, respectively, from the next program address. For transition 314, a single-word instruction is issued from instruction word W1 and instruction word W2 does not include a jump to subroutine instruction (JSR). W2 is loaded into W1 via MUX1 220 and W2 and W3 are loaded with the MSW and LSW, respectively, from the next address in memory, bringing the instruction register to odd state 320. Also, a program counter (PC), not shown, is incremented by two instruction words.

For transition 316, there is a change in program flow such as a jump, branch, jump to subroutine, return from subroutine, or a return from interrupt that takes the unit 200 from even state 310 to jump odd (JMP_ODD) state 330. Transition 316 occurs when the change in program flow is to an odd address. The instruction word located at the odd address is loaded into W1; the contents of W2 and W3 are not considered or are discarded by controller 210. This is represented in the figure by a "x" contained in the register word. During this transition, the program counter is incremented by one.

For transition 318 from state 310, representing a jump to subroutine at an odd address, the jump instruction word in W1 is issued to the instruction decoder, W2 is loaded into W1, and W2 and W3 are loaded with the double instruction words from memory. Also, the program counter is incremented by one.

The other steady-state in the state diagram of FIG. 3 is odd state 320. Transition 322 from odd state 320 occurs when a double-word is issued from instruction register 240 for execution of either a double-word instruction or two single-word instructions, and W2 does not contain a JSR. Thereafter, W3 is loaded into W1 and W2 and W3 are loaded from memory. Also, the program counter is incremented by two and the transition returns to state 320, since W3 is also a LSW. For transition 324, a single-word is issued from W1, W1 is then loaded with W2 and W2 is loaded with W3, causing the transition into state 310. In transition 326, a change in program flow occurs to a destination at an odd address so that W1 is then loaded with the LSW from memory at that odd address and the program counter is incremented by one, transitioning to state 340. In transition 328, a double-word or two single-words are issued from W1 and W2 and W3 equals a JSR. Therefore, when W3 is loaded into W1 and W2 and W3 are loaded from memory and the program counter is incremented by one, the register transitions into state 330.

When instruction register 240 is configured in the non-steady-state state 330, a transition 332 occurs when a jump to subroutine occurs to an odd address, so that the IW LSW is loaded from memory at that odd address into W1 and the program counter is incremented by one, transitioning into state 340. During transition 334, a jump to subroutine to an even address occurs, W1 and W2 are loaded with the double-word from memory and the program counter is incremented by two, transitioning the register into state 310.

The second non-steady-state 340 includes the transition 342, where W1 is a double-word instruction and does not equal a JSR. Because only a single-word has been loaded into the instruction register, the processor must stall a clock cycle in order to retrieve the second word of the double-word instruction or the parallel instruction to be executed concurrently. During the stall, W2 and W3 are loaded from memory with the double-word (IW MSW and IW LSW), transitioning the register to state 320. In transition 344, a single-word issued from W1, and then W1 and W2 are loaded with the double-word from memory and the program counter is incremented by two, transitioning into state 310. In transition 346, W1 is a double-word instruction and W1 is a JSR. The processor must be stalled one clock cycle while W2 and W3 are loaded with the double-word from memory and the program counter is incremented by one, transitioning into state 330. In transition 348, a return from subroutine or branch to an odd address is issued from W1. W1 is then loaded with the LSW of the accessed memory words and the program counter is incremented by one after being updated during a stall cycle, the state returning to state 340. Thus, when instructions are misaligned in memory and the target instruction of a change in program flow is two instruction words in length and on an odd boundary, an additional instruction fetch cycle is required.

As will now be appreciated, the fetch and issuance unit of a preferred embodiment of the present invention efficiently fetches and issues up to two instructions per clock cycle without requiring the processor to stall to retrieve an additional word. Thus, during sequential execution of a program (i.e. steady-state operation), the system of the preferred embodiment will always issue at least one instruction for every clock cycle regardless of the instruction word length. In addition, the fetch and issuance unit can issue a dual-word instruction or two instructions in parallel without stalling the processor. The systems of the prior art were not capable of such performance. The enhanced performance of the preferred embodiment is achieved by increasing the number of instructions that may be executed per cycle and by reducing the impact of instruction fetch delays. Thus, instructions fetched do not have to be loaded again from memory on another clock cycle, thereby avoiding unnecessarily increasing bus traffic. Further, a complex memory controller and system hardware to maintain the rigid memory configuration of aligning double-word instructions in memory such that a single access will retrieve both words of the double-word instruction is not necessary. Therefore, the fetch and issuance apparatus of the present invention is being capable of fetching and issuing both single and double-word instructions, and further is capable of issuing two single-word instructions to be executed simultaneously in a parallel processor without substantially increasing the cost and complexity of the system by adding additional complex components and/or under-utilizing memory space.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true scope of the invention.

What is claimed is:

1. An instruction fetch and issue apparatus for a data processing system having an instruction set including multiple word instructions or that issues multiple instructions in parallel, comprising:

an instruction register having a first register, a second register, and a third register containing a first register word, a second register word and a third register word, respectively, wherein the instruction register transfers instruction words from the first register, second register, and third register, in response to a load signal;

a first multiplexer that receives a first instruction word and a second instruction word from a memory and receives the second and third register words from the instruction register, and transfers a selected one of the received words into the first register in the instruction register based on a first control signal; and a second multiplexer that receives the first and second instruction words from the memory and the third register word, and transfers a selected one of the received words into the second register based on a second control signal.

2. The apparatus of claim 1, further comprising a controller providing the first control signal, the second control signal, and the load signal, wherein the controller provides the load signal based on a state of the first, second and third register words and provides the first and second control signals based on a next state of the first, second and third register words.

3. The apparatus of claim 2, wherein the controller includes means for calculating the location in memory that next first and second instruction words to be received by the first and second multiplexers are located.

4. The apparatus of claim 1, wherein the instruction register issues at least one instruction per a clock cycle.

5. A method for fetching and issuing at least one instruction word for every clock cycle of a data processing system having an instruction register holding a first, second and third word, wherein the data processing system can execute a single-word instruction, a double-word instruction, or multiple single-word instructions in parallel, the method comprising the steps of:

receiving two instruction words;

selecting the first word from among the received two instruction words and the second and third words of the three words held in the instruction register;

selecting the second word from among the received two instruction words and the third word of the three words held in the instruction register;

selecting the third word from among the received two instruction words;

loading the selected words in the instruction register; and issuing, in a single clock cycle, the number of words held in the instruction register required for execution of a first instruction.

6. The method according to claim 5, wherein the step of issuing includes issuing, in the same single clock cycle, the required number of words to execute a second instruction.

7. The method according to claim 6, wherein the first instruction and second instruction are executed in parallel by the data processing system.

8. The method according to claim 5, wherein the first instruction is a double-word instruction.

9. The method according to claim 5, wherein the first instruction is a single-word instruction.

* * * * *